United States Patent [19]

Howitt

[11] 4,365,544
[45] Dec. 28, 1982

[54] PREPARATION OF BEVERAGES

[76] Inventor: George Howitt, High Lanes, North Dr., Wentworth, Surrey, England

[21] Appl. No.: 225,745

[22] Filed: Jan. 16, 1981

[30] Foreign Application Priority Data

Jan. 22, 1980 [GB] United Kingdom ............. 8002141

[51] Int. Cl.³ .......................................... A47J 31/18
[52] U.S. Cl. ................................. 99/297; 99/319
[58] Field of Search ............ 99/287, 297, 319, 306, 99/302 P, 318, 320, 322, 316

[56] References Cited

U.S. PATENT DOCUMENTS

| 1,405,662 | 2/1922 | Biette | 99/306 |
| 1,699,303 | 1/1929 | Mennicke et al. | |
| 2,109,363 | 2/1938 | Williams | |
| 3,158,084 | 11/1964 | Cohn | |
| 3,339,476 | 9/1967 | Troya | 99/287 |
| 3,349,690 | 10/1967 | Heier | |
| 3,413,908 | 12/1968 | Nadelson | |
| 3,657,993 | 4/1972 | Close | |
| 3,935,318 | 1/1976 | Milhailide | |

FOREIGN PATENT DOCUMENTS

| 1557460 | 1/1969 | France. |
| 854867 | 11/1960 | United Kingdom. |
| 945608 | 1/1964 | United Kingdom. |
| 1329914 | 9/1973 | United Kingdom. |
| 1376074 | 12/1974 | United Kingdom. |
| 1427375 | 3/1976 | United Kingdom. |

Primary Examiner—Robert W. Jenkins
Attorney, Agent, or Firm—Merchant, Gould, Smith, Edell, Welter & Schmidt

[57] ABSTRACT

Apparatus for preparing a beverage, such as coffee, by extraction of soluble matter from a solid flavoring material into a liquid, in which a jug in the form of a thick walled vessel supported in a frame, acts as a cylinder, and a piston in the form of a capsule containing a flavoring material such as coffee, is arranged to rotate as it is moved axially within the cylinder. The capsule has liquid permeable membranes in axially opposed regions to allow liquid to be forced through the capsule to extract the flavor from the material within it without any of this material being able to escape. The capsule is detachable from the piston for refill or replacement.

8 Claims, 5 Drawing Figures

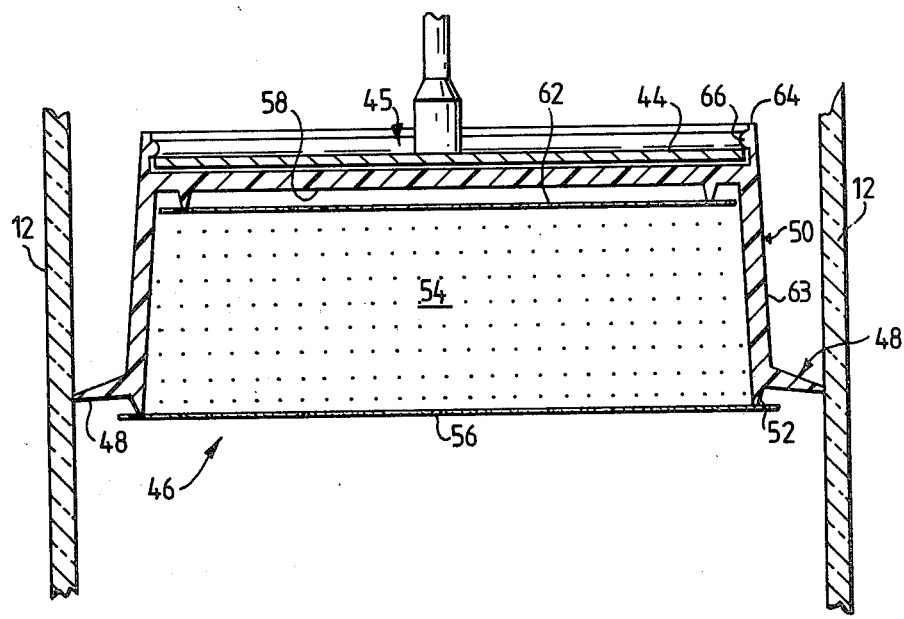
Fig.3.
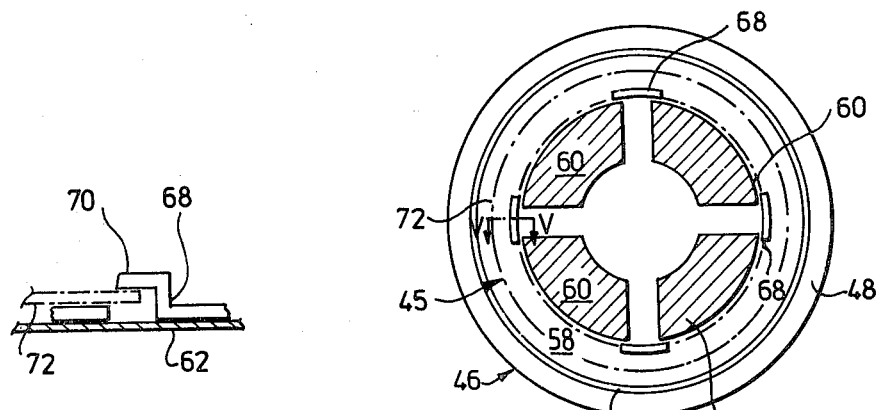
Fig.5.
Fig.4.

PREPARATION OF BEVERAGES

FIELD OF THE INVENTION

The present invention relates to the preparation of beverages, especially coffee.

To prepare proper coffee it is necessary to treat ground, roasted coffee beans with hot water under conditions such that suitable quantities of the soluble constituents of the roasted beans are extracted into the water. There are many variables which can affect the quality of the resulting beverage, including the quantity of bens, how finely they are ground, the length of time allowed for extraction ('brewing'), the temperature of the water (which may vary during the process), and the nature of the contact between the coffee and the water. Consequently, much care or skill is needed to produce a beverage of consistently high quality, and the process is quite time consuming. There may also be problems associated with separating the grounds from the beverage, and disposing of them.

DESCRIPTION OF THE PRIOR ART

It is known to prepare 'filtered coffee' by measuring a desired quantity of ground coffee into a filter paper in a funnel, pouring boiling water into the funnel, and allowing it to pass through. The process is quite slow, so that the filtrate may need reheating.

One known type of machine which operates on this 'filtered coffee' principle is disclosed in British Pat. No. 945,608. The machine disclosed is capable of cyclically brewing and dispensing a brewable beverage in a measured quantity. In each cycle a quanity of the ingredient is ground and a measured quantity thereof is delivered to a brewing device. The ground ingredient is then infused with a measured quantity of hot water and the brewed liquid is then filtered through a renewable filter paper, before being delivered to a cup at the delivery station. The filter paper has to be renewed after every cycle.

Another type of machine which operates on a forced flow principle is disclosed in British Pat. No. 1,329,914. In this machine hot water is forced through the beverage material in a brew cup by a piston and cylinder arrangement, in which the cylinder is urged into sealing engagement with the brew cup. The piston then forces hot water through the brew cup, the brewed beverage being dispensed through an outlet conduit to a drinking cup. Thereafter, the brew cup containing the spent beverage material is moved to an ejection position and the spent material is disposed of.

A similar machine is also disclosed in U.S. Pat. No. 3,349,690. This machine additionally includes the introduction of freshly ground coffee into the brewing cup. Here again, the spent coffee grounds must be disposed of after use.

Disposable filter-packages for the preparation of coffee infusion are known from British Pat. Nos. 1,376,074 and 1,427,375. The advantage of the 'closed brewing' systems proposed in the above disclosures is that volatile aromas in the form of gases are confined and are not lost in the 'open brewing' systems used in the machines disclosed in British Pat. Nos. 945,608 and 1,329,914.

However, the above referred to filter-packages are designed for a free flow of hot water therethrough and the structure of these filter packages is so delicate that they would not be capable of withstanding a forced flow of hot water. Moreover such filters have to be correctly positioned in the machine or coffee pot and this necessitates extra time for their correct positioning before use as well as their removal after use.

It is therefore an object of the present invention to overcome partially or wholly the above referred to disadvantages of known types of beverage machines and in particular coffee brewing apparatus.

SUMMARY OF THE INVENTION

According to the present invention there is provided apparatus for preparing a beverage by extraction of soluble matter from a generally solid flavouring material into a liquid, said apparatus including a cylinder and piston assembly, said piston comprising a detachable capsule containing a said flavouring material and having liquid permeable membranes in axially opposed regions, whereby relative axial movement of said piston through liquid contained in said cylinder forces liquid through said capsule via said permeable membranes, the liquid contacting said flavouring material within the capsule and extracting soluble matter from it.

In a preferred embodiment said cylinder is provided by a jug. The piston may have a piston rod for displacing it manually. Suitably the jug has a lid with an axial aperture through which the piston rod passes, preferably substantially sealingly. The rod and aperture may have corresponding screw-threads so that downward pressure on the rod causes the piston to rotate relative to the cylinder, thus lessening its tendency to stick.

Preferably the capsule is of generally cylindrical or frusto-conical form and is provided with an annular flange extending outwardly from a lower region thereof. Preferably, the capsule contains such a quantity and quality of flavouring material that a single passage of the piston through a cylinder of liquid (e.g. boiling water) converts the liquid into the beverage.

BRIEF DESCRIPION OF THE DRAWINGS

The present invention will now be described in greater detail by way of example with reference to the accompanying drawings, in which:

FIG. 3 is a large-scale schematic sectional view along III—III on FIG. 1;

FIG. 4 is a plan view of an alternative capsule construction; and

FIG. 5 is a section on V—V in FIG. 4.

DESCRIPTION OF THE PREFERRED EMBODIMENTS

Figure 1:
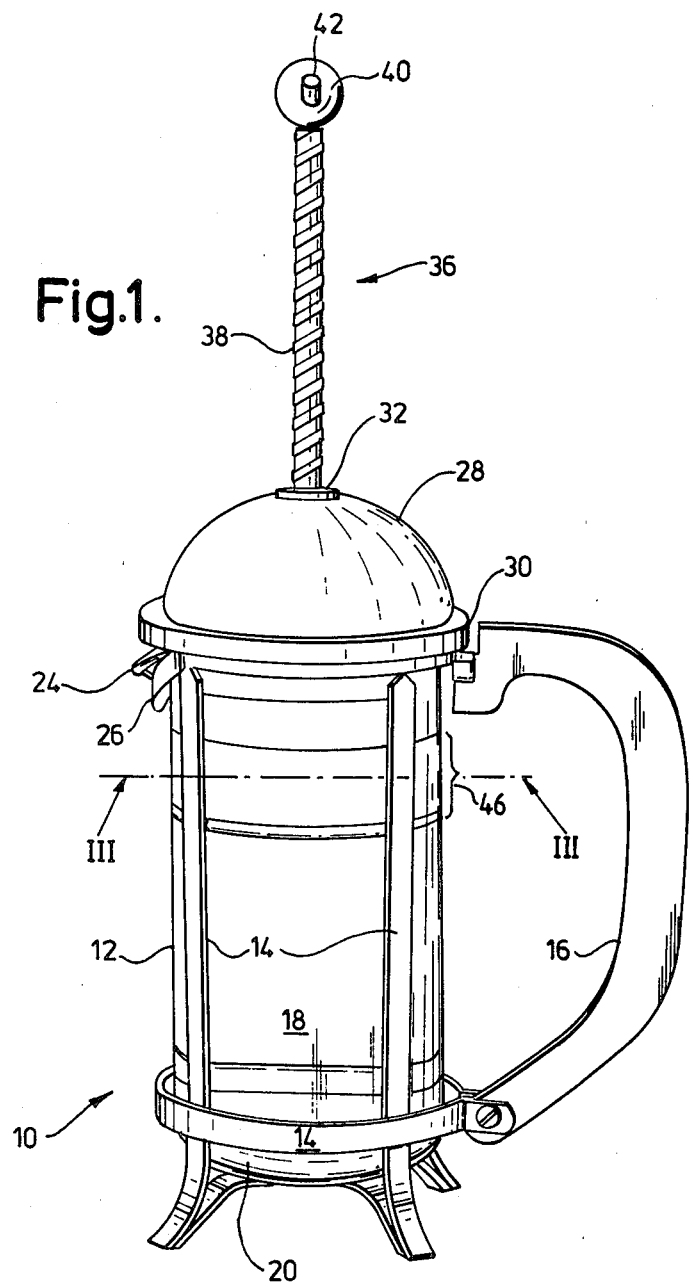
FIG. 1 is a side elevation of one preferred form of coffee pot which includes apparatus embodying the invention in use.
Figure 2:
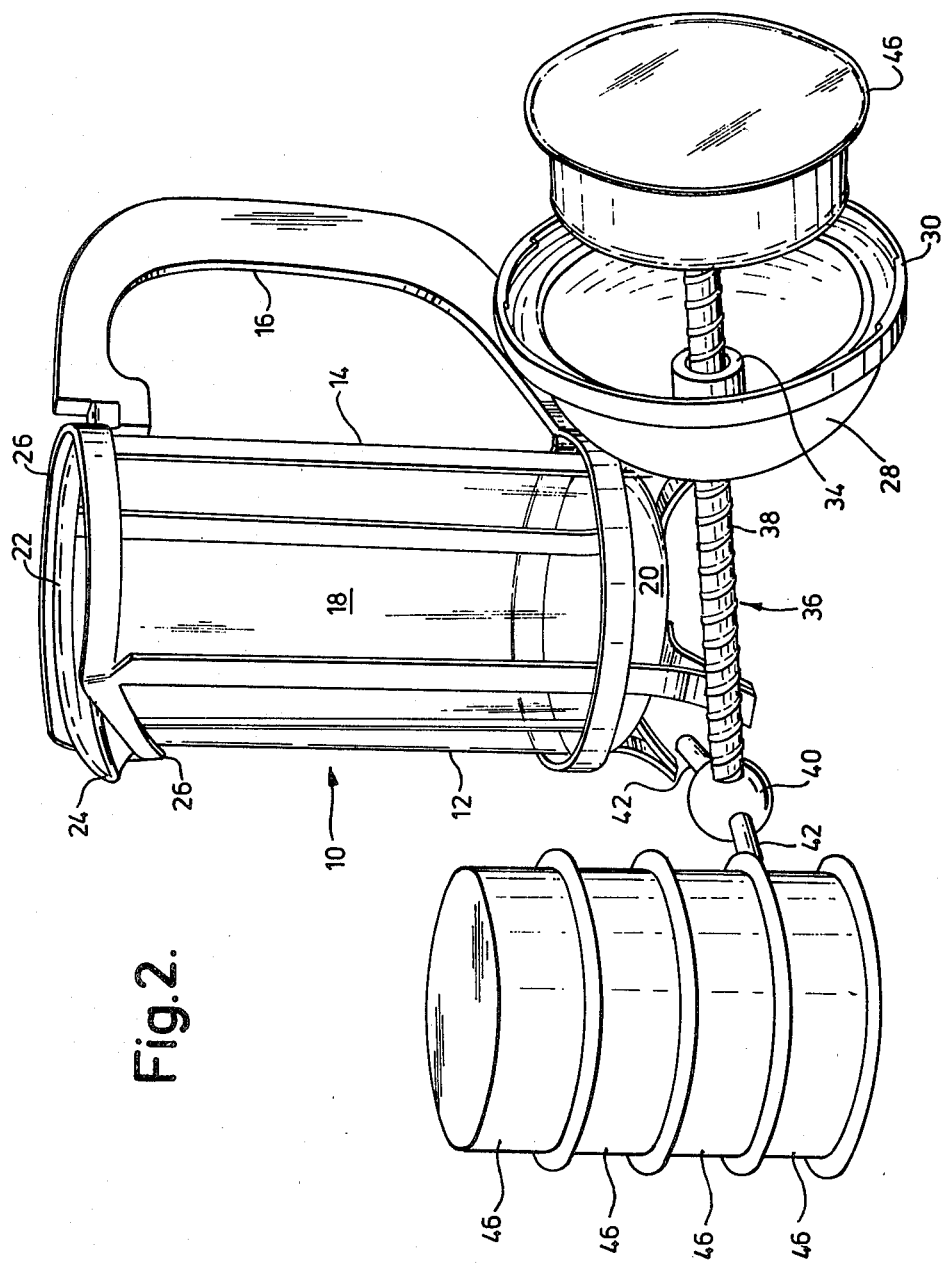
FIG. 2 is a view similar to FIG. 1 but showing the components partly disassembled, and spare capsules.

Referring first to FIG. 1 and 2, the coffee pot is in the form of a jug 10 which consists of a thick-walled vessel 12 of heat-resistant glass removably supported in a brass frame 14 to which a thermally insulating handle 16 is attached. The vessel 12 has a cylindrical body 18 which is provided with a curved base 20. The purpose of the curved base 20 is principally to provide a means for breaking the seal of the rim of the capsule (to be described later) thus facilitating easy removal thereof. It also avoids sharp angles and imparts greater strength to the cylindrical body. The cylindrical body 18 is also provided with an upper rim 22 having a lip 24. The brass frame 14 includes an upper generally circular band 26.

A domed brass lid 28 rests on the band 26 with an annular flange 30 partially overlapping the radially outer face of the band 26, which it abuts, thereby seating the lid 28 positively and centrally. The lid 28 has a central axial orifice 32 with an internal threaded boss 34 (FIG. 2). A piston rod 36 passes through the orifice 32 and boss 34. The piston rod 36 has an external thread 38 corresponding to the internal thread of the boss 34. The threads are of a sufficiently long pitch for a downward force on the rod to be generally sufficient to cause the rod to spin downwards. The upper end of the rod 36 has a smooth knob 40 for applying such a force manually, and also laterally extending handle portions 42.

Referring now to FIG. 3, at the lower end of the rod 36, there is a means 45 for releasably attaching a capsule 46. The means 45 comprises a coaxial disc 44, whose diameter is somewhat less than the internal diameter of the cylindrical jug body 18. The disc 44 has apertures passing through it to allow the passage of water from the capsule 46.

A capsule 46 is of generally cylindrical or frusto-conical (narrowing upwards) form, with an annular flange 48 extending outwardly from a lower region thereof. The dimensions of the vessel 12 and capsule 46 are such that the capsule fits in the body 18, the flange 48 abutting the wall thereof to provide a substantially liquid-tight seal, while permitting relative sliding of the capsule 26 and the vessel 12. The capsule may have a body 50 and integral flange 48 moulded from a suitable plastcs material, e.g. polypropylene, the flange being shaped and dimensioned so that on insertion of the capsule into the vessel it is slightly resiliently deformed to provide a seal. This flange 48 is further deformed by the curved base 20 when it is forced to the bottom by the piston rod 26, thus facilitating the removal of the combined capsule and piston rod from the cylindrical jug body 18. The body 50 is in the form of an inverted cup, the flange being adjacent the lower rim 52 thereof. The 'cup' contains finely ground coffee 54 which is retained by a disc 56 constructed of a filter medium (e.g., a filter paper) glued around the rim 52. The base 58 of the inverted cup has a plurality of equi-spaced apertures not visible in the FIG. 3 section. A further disc 62 constructed of filter medium is glued inside the base 58. The two discs 56 and 62 thus constitute a pair of liquid permeable membranes. Thus water can pass through the disc 56 into the interior of the capsule 46 where it contacts the coffee 54. The water can then pass out of the capsule via the disc 62 and the apertures provided in the base 58.

In the first embodiment shown in FIGS. 1 to 3, the sidewall 63 of the capsule body 50 extends beyond the base 58 to provide an annular flange 64 having an inward annular projection 66. This is so dimensioned that the disc 44 of the piston rod 36 can be pushed down, bowing the flange 64 outwards slightly, till the disc engages with a snap-action beneath the annular projection 66. In this position there is sufficient friction between the plate 44 and the capsule to enable the capsule to rotate as it moves down the cylindrical jug 18.

In an alternative capsule construction shown in FIGS. 4 and 5, the sidewall 63 of the body 50 does not extend beyond the base 58, which is generally planar, with four equi-spaced apertures 60 and four equi-spaced upstanding lugs 68. Each lug 68 has a radially outward projection 70. A corresponding rod 36 may have attachment means 45 comprising a ring 72 (shown in dashed-dotted line in FIGS. 4 and 5) which can snap-engage under the lugs 68.

In order to make coffee, the rod 36 and lid 28 are removed from the vessel 12. A fresh capsule 46 is engaged on the rod 36, and withdrawn as far as possible into the lid 28. Boiling water is poured into the vessel 12, the lid is fitted, and the knob 40 is screwed downwardly. This causes rotation of the piston together with the capsule, thus forcing the capsule down into the vessel 12, whereby water is forced up through the capsule. This rotation of the capsule as it moves down through the water has the advantage that there is no bounce back owing to friction between the flange 48 and the cylindrical jug 18. FIG. 1 shows an intermediate stage in this process, the piston having passed only a short way down the vessel. As indicated the liquid above it has been coloured (and flavoured) by its passage through the coffee 54. With a suitable grade of coffee in the capsule, a single descent through the water, which takes a matter of seconds, converts the water to coffee, which can be served immediately. The capsule remains at the bottom of the jug until the contents have been poured out. It may then be easily withdrawn, detached and disposed of simply and without mess.

This method of making coffee has the benefits of speed and convenience. A predetermined quantity of coffee of known quality is employed. This is not only economical because one uses a fixed quantity, but is also economical because more liquid coffee can be produced from a given weight of ground coffee. In a commercial establisment this facilitates portion control, cost control and stock control. The beverage produced is completely free from grounds and sediment. The very short brewing time means that the beverage can be served very hot; it also avoids the risk, present with long brewing times, that the beverage will deteriorate and/or extract undesirable components from the coffee solids.

Preferred constructional forms have been described, but of course much variation is possible. For example, a metal or plastics jug could be employed. It must of course be strong enough to withstand the forces associated with the passage of the piston. The components which come in contact with the beverage should of course be such as will not taint it or be substantially harmed themselves. Instead of a disposable capsule, a refillable one could be used. This would retain the benefit of rapid brewing, and might be more economical. There would however be some lessening in convenience.

Although the foregoing description has been directed primarily to coffee-making, the invention is equally applicable to the preparation of other decoctions and infusions, e.g. tea and herbal brews.

What I claim and desire to secure by Letters Patent is:
1. An apparatus for preparing a beverage by extraction of soluble matter from a generally solid flavouring material into a liquid, said apparatus including a cylinder and a piston assembly, said piston assembly comprising a detachable capsule containing a flavouring material and being constructed in the form of an inverted cup, said capsule having an annular wall, a rim along said wall, a base containing apertures therein, a first disc constructed of filter medium supported on said base, a second disc constructed of filter medium secured to said annular wall rim, said solid flavouring material being retained within said capsule by said first and second filter mediums, and an annular flange constructed and designed so as to be slightly deformed upon insertion into said cylinder to sealingly engage said cylinder, whereby relative axial movement of said piston assembly through liquid contained in said cylinder forces liquid through said capsule first and second filter mediums, the liquid contacting said flavouring material within the capsule and extracting soluble matter therefrom.

2. The apparatus according to claim 1, wherein said annular flange is formed by an extension of said wall of said capsule which extends beyond said base, said flange having an inwardly extending annular projection, and said piston having a disc constructed and designed to snap beneath and engage said annular projection thus retaining said capsule.

3. The apparatus according to claim 1, wherein a plurality of equi-spaced lugs are provided on said wall of said capsule in the region of said base, a radially outwardly extending projection being formed on each of said lugs, and said piston having a ring constructed and arranged to snap beneath and engage said lugs thus retaining said capsule.

4. The apparatus according to claim 1, wherein said cylinder is a generlly thick-walled vessel having a curved base, whereby said flange of said capsule is deformed sufficiently by said curved base when said piston assembly is pushed to the bottom of said cylinder thereby destroying the sealing engagement of said flange and said cylinder.

5. An apparatus for preparing a beverage by extraction of soluble matter from a generally solid flavouring material into a liquid, said apparatus including: a generally cylindrical vessel having an open end and an internally curved base; a lid removably secured at said vessel open end, said lid having a central portion with an aperture therein; a disc having a diameter less than that of the internal diameter of said vessel; a capsule for containing a flavouring material, said capsule having a pair of liquid permeable membranes, spaced apart axially, each of said membranes allowing the passage of liquid therethrough; means for detachably securing said capsule to said disc to form a piston assembly, a rod having a first end attached to said disc and a second end projecting through said aperture in said lid enabling the manual operation of said piston assembly; and a flange formed on the exterior surface of said capsule, said flange having a diameter slightly larger than the internal diameter of the vessel whereby a liquid tight seal is provided between said flange and said vessel to force the liquid through said permeable membranes when said capsule is pushed downwardly in said vessel, said flange being deformed and said seal being destroyed by said curved base of said vessel when said capsule reaches said base.

6. The apparatus according to claim 5, wherein said apparatus further includes a frame for supporting said vessel, a thermally insulated handle attached to said frame, and an operating knob secured to said second end of said rod.

7. The apparatus according to claim 5, wherein a boss is contained in said lid aperture, said boss having an internal thread, and said rod is provided with an external thread corresponding to the internal thread of said boss, whereby downward force on said rod causes rotation of said capsule as said rod moves axially downward within said vessel.

8. The apparatus according to claim 5, wherein said capsule is constructed and designed as an inverted cup comprising: an annular wall having a rim and a base containing apertures therein; one of said liquid permeable membranes being supported on said base; and said other liquid permeable membrane being secured to said rim of said capsule wall, the solid flavouring material being retained within said cup between said liquid permeable membranes.

* * * * *

UNITED STATES PATENT AND TRADEMARK OFFICE
CERTIFICATE OF CORRECTION

PATENT NO. : 4,365,544

DATED : December 28, 1982

INVENTOR(S) : George Howitt

It is certified that error appears in the above—identified patent and that said Letters Patent is hereby corrected as shown below:

Column 1, line 13, "bens" should be --beans--;

Column 1, line 33, "quanity" should be --quantity--;

Column 3, line 30, "capsule 26" should be --capsule 46--;

Column 3, line 32, "plastcs" should be --plastics--;

Column 4, line 32, "establisment" should be --establishment--;

Column 5, line 24, "generlly" should be --generally--.

Signed and Sealed this

Fifteenth Day of March 1983

[SEAL]

Attest:

Attesting Officer

GERALD J. MOSSINGHOFF

Commissioner of Patents and Trademarks